DISK-BRAKE SYSTEM INCLUDING PLURAL ACTUATORS

Filed June 1, 1967

INVENTOR.
HEINZ FRIGGER

BY

Karl G. Ross

ATTORNEY

INVENTOR.
HEINZ FRIGGER
BY
Karl G. Ross
ATTORNEY

INVENTOR.
HEINZ FRIGGER
BY
Karl G. Ross
ATTORNEY

Feb. 4, 1969 H. FRIGGER 3,425,519
DISK-BRAKE SYSTEM INCLUDING PLURAL ACTUATORS
Filed June 1, 1967
Sheet 4 of 10
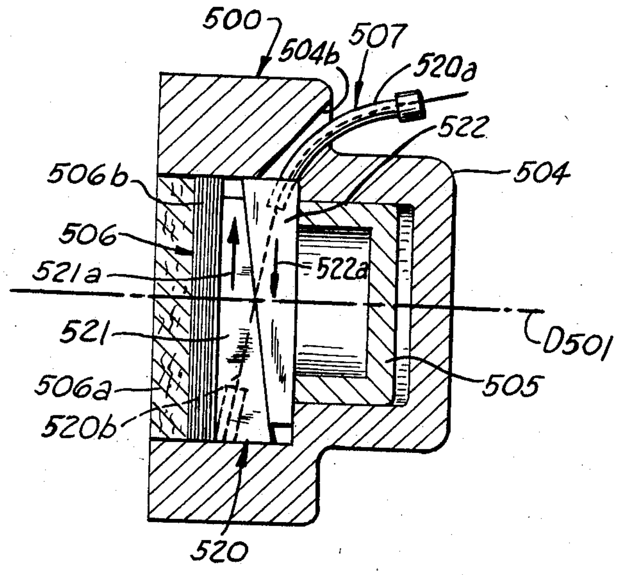
FIG. 5
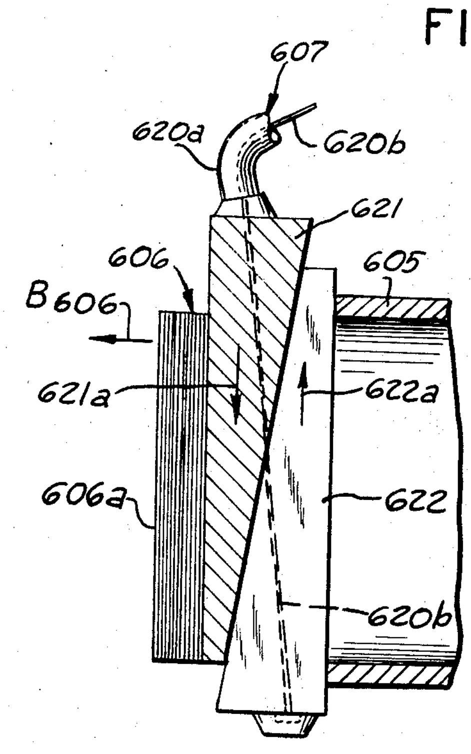
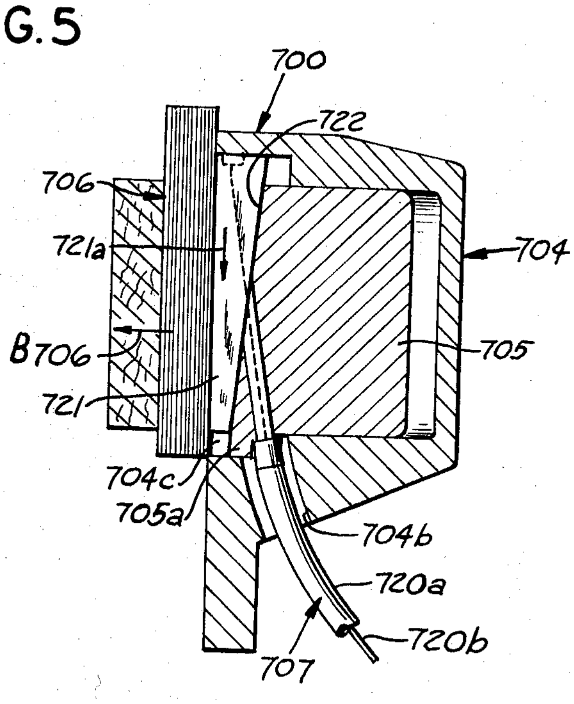
FIG. 7
FIG. 6
INVENTOR.
HEINZ FRIGGER
BY
Karl F. Ross
ATTORNEY INVENTOR.
HEINZ FRIGGER
BY
Karl F. Ross
ATTORNEY INVENTOR.
HEINZ FRIGGER
BY
Karl F. Ross
ATTORNEY.

INVENTOR.
HEINZ FRIGGER
BY
Karl F. Ross
ATTORNEY

INVENTOR.
HEINZ FRIGGER
BY
Karl F. Ross
ATTORNEY

INVENTOR.
HEINZ FRIGGER
BY
Karl F. Ross
ATTORNEY

INVENTOR.
HEINZ FRIGGER
BY
Karl F. Ross
ATTORNEY.

United States Patent Office
3,425,519
Patented Feb. 4, 1969

3,425,519
DISK-BRAKE SYSTEM INCLUDING PLURAL ACTUATORS

Heinz Frigger, Langen-Oberlinden, Germany, assignor to Alfred Teves Maschinen- und Armaturenfabrik K.G., Frankfurt am Main, Germany, a corporation of Germany Filed June 1, 1967, Ser. No. 642,915
Claims priority, application Germany, June 11, 1966, T 31,333; June 24, 1966, T 31,443, T 31,444, T 31,445; June 25, 1966, T 31,457
U.S. Cl. 188—73 14 Claims
Int. Cl. F16d *55/22, 65/52;* F16h *35/18*

ABSTRACT OF THE DISCLOSURE

The invention relates to a disk brake having a brake disk, a brake support yoke disposed along the periphery of the disk, a pair of brakeshoes flanking braking faces of the disk and an actuating piston on the support yoke for shifting the brakeshoes into engagement with said disk to brake the latter. A wedge member having at least one wedging surface converging at an acute angle toward a braking face of the disk and displaceable in the direction of convergence of the wedging surface while being interposed between the support and piston or between piston and brakeshoe actuates the brake. A Bowden cable, spindle, eccentric, cam or other means is used for applying a force to said wedge member.

My present invention relates to a disk-brake system in which a pair of brakeshoes flank a brake disk whose braking faces extend transversely to the axis of rotation of the disk, which may be coupled to the wheel of a motor vehicle, while a brake yoke or support, affixed generally to the axle housing or chassis, lies along the periphery of the disk and is provided with one or more hydraulic cylinders for urging the brakeshoes thereagainst; more particularly, the present invention relates to auxiliary actuating means for shifting the brakeshoes, e.g. for use as parking, locking or emergency brake or for the automatic, self-adjustment of a pair of brakeshoes with respect to the disk.

It is common practice to provide, in a disk-brake system having a pair of brakeshoes flanking the disk and one or more hydraulic or other fluid-responsive cylinders for actuating these brakeshoes, self-adjusting means for compensating wear of the brake linings and/or mechanically operable brakeshoes for locking the disk relatively to the brake housing and serving as a parking emergency locking brake. In some cases, it has been proposed to employ a lever or the like to advance a hydraulic cylinder upon the tensioning of a flexible cable, thereby producing a clamping action independent of the hydraulic system for locking of the brake or for emergency operation thereof upon failure of a component of the hydraulic system.

Alternatively, a pair of separate brakeshoes are provided for actuation via a toggle arrangement or lever linkage to perform a similar function. Most self-adjusting mechanisms for hydraulically operable disk brakes provide friction means or pawl-and-ratchet systems for stepping the brakeshoe relative to the hydraulic piston upon wear of the brake linings, thereby maintaining the stroke of the brakeshoe required for actuation within relatively narrow limits. All of the prior-art mechanisms for these purposes have, in general, been unsatisfactory for various reasons. Thus, on the one hand, the lever linkages are relatively complex, expensive, and prone to failure while friction arrangements interposed between the hydraulic cylinders and a brakeshoe are sensitive to contamination by the hydraulic fluid or wear of the frictional surface. On the other hand, devices providing mechanical means operable through the hydraulic cylinder for urging the brakeshoes in the direction of the disk, involve complicated sealing arrangements, pawl-and-ratchet assemblies and the like.

It is, therefore, the principal object of the present invention to provide an improved auxiliary-brake-actuating mechanism, especially suitable for use in disk brakes having hydraulic actuating cylinders on one or both sides of the disk which obviates the aforementioned disadvantages and permits operation of the brake for emergency, parking or locking action in a relatively simple and economical manner.

A further object of this invention is to provide a simplified and effective self-adjusting means for disk brakes of the general character described.

Yet another object of my invention is to provide an auxiliary brake-locking or braking mechanism in the disk-brake system of the character described which is actuatable from the operator's position of the vehicle and can be employed to apply the brake to an emergency-braking, brake-locking or parking-brake system.

Another object of my invention is to provide, in a disk-brake system having hydraulically actuatable brakeshoes, an auxiliary brake system with a further pair of brakeshoes and an improved mechanism for actuating same, advantageously from the operator's position of an automotive vehicle.

I have discovered that the foregoing objects can be attained in a relatively simple system applicable both to self-adjusting arrangements and to auxiliary brake mechanisms when the disk-brake system, having a disk whose braking faces are transverse to the axis of rotation of the disk and a yoke or brake support lying along the periphery of the disk, is provided with a member preferably forming a wedge and having at least one effective surface inclined at an acute angle toward one of the braking faces and interposed between a brakeshoe member and a support member (e.g. the piston or housing) while being shiftable in the direction of convergence of the brake face and the inclined surface of this member. The member, hereinafter referred to frequently as a shiftable or displaceable wedge, can be advanced automatically by springs or the like when the apparatus is employed as a self-adjusting system, or can be displaced by flexible cables, spindles, eccentric or cam arrangements or the like when it is to be used as the auxiliary braking mechanism of the disk-brake system. The brakeshoe which is displaced by the actuating body, may be an auxiliary brakeshoe flanking the disk independently of the hydraulically actuatable brakeshoes or may be the latter, the wedge-like member thus being disposed between the hydraulic means and the brakeshoe upon which it acts.

According to a specific feature of this invention, a locking, emergency or parking brake is provided with operating means at the driver's postion of the vehicle coupled to the wedgelike member via force-transmission means (e.g. a Bowden line or cable) the operating means being constituted as a manually shiftable lever, foot-operated pedal or the like. It should be noted that a locking-brake shoe can be disposed on one side of the disk or a pair of such shoes may be provided on either side thereof. In the latter case, an auxiliary brake yoke may be provided to transmit the necessary force to a brakeshoe remote from the brakeshoe against which the wedge member is applied. This principle holds true when the locking-brake shoe is also a main-brake shoe and the wedge members are disposed between the hydraulic or pneumatic actuating means and the brakeshoe. Furthermore, when a pair of brakeshoes is to be operated concurrently, by the wedge member, it has been found advantageous to provide a pair of wedge bodies, each disposed between a respective support and the brakeshoe on either side of the disk and to provide separate actuating likages for each of these bodies.

Whether the wedge member is automatically adjustable under the influence of a spring system or the like, or is shifted by an operating linkage, I have found it to be desirable to provide self-locking means between the wedge member and a surface against which its force is applied. Thus the self-locking means can be constituted by the frictionally interengaging surfaces themselves, the angle of inclination of the ramp of the wedge member and the co-operating surface being selected in dependence upon the coefficient of sliding friction such that the wedge is not urged away from the direction of convergence of the ramp surface. Alternatively, the co-operating surfaces can be toothed (serrated), roughened or coated with a material of high frictional coefficient so as to impede reverse movement of the wedge while permitting advance in the direction of convergence. Furthermore, the wedge body in accordance with the present invention can be of generally prismatic configuration with generally planar wedge surfaces converging toward one another in the direction of advance of the body and of generally flat configuration. One of these surfaces may be parallel to the braking face of the disk and engageable with a confronting surface of the support member or hydraulic piston (actuating member) or with the backing plate of the brakeshoe member. The other surface may be inclined to the plane of the braking face and disposed at an acute angle to the axis of the cylinder while engaging a complementarily inclined surface of the piston or the backing plate of the brakeshoe. In other variations along these lines, the present invention provides a plurality of wedgelike members convergent in opposite directions while the actuating means bears simultaneously upon at least two of these wedge members for shifting them relatively in the direction of the respective convergencies. In the preferred case, the movement of the wedge member or members is parallel to the disk and produces an axial displacement of the respective brakeshoe or brakeshoes.

According to a further feature of this invention, the wedge body is hollow and receives a spring biasing the wedge in the direction of its actuating movement or in the opposite direction. Thus, when springs are provided for the automatic shifting of the wedge in a self-adjusting mechanism, the spring is effective to advance the body in the direction of convergence of its surfaces and is housed within the wedge body at least in part. When an external operating mechanism is employed, the spring received at least in part within the wedge body may apply a restoring force thereto effective in the direction opposite the direction of convergence. The actuating mechanism itself, e.g. a Bowden cable, can either run substantially parallel to the radius of the disk or parallel to a secant thereof.

It has been found to be especially convenient to run the Bowden line at least partly in a direction parallel to a secant of the disk when the disk brake is partly or wholly mounted in the wheel disk of the vehicle since the rim and the dished portions of the wheel disk define the outer boundaries of the disk-brake assembly. The Bowden cable in this case preferably runs radially inwardly so as not to interfere with the dished disk. The actuating or transmission element can, moreover, run parallel or skew to the axis of the disk.

The above and other objects, features and advantages of the present invention will become more readily apparent from the following description, reference being made to the accompanying drawing in which:

FIG. 5 is a diagrammatic axial cross-sectional view of a hydraulic brake-actuating system provided with a wedge arrangement in which the movable parts are displaced generally parallel to a secant of the disk;

FIG. 6 is an enlarged cross-sectional view of an arrangement according to this invention wherein one of the cooperating wedge members is formed by the backing plate of a brakeshoe;

FIG. 7 is a cross-sectional view through the hydraulic cylinder of a disk brake in which one of the co-operating wedge members is formed by the brake-actuating piston;

Figure 1:
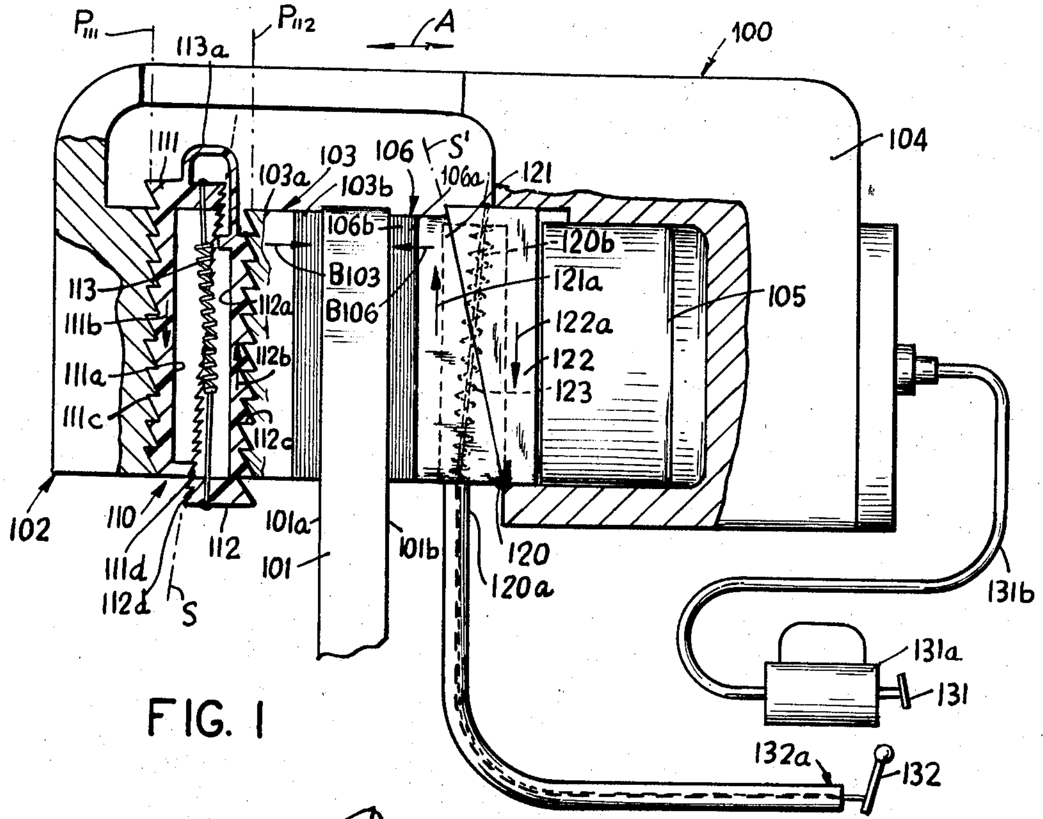
FIG. 1 is a diagrammatic elevational view, partly in section, of a disk brake provided with an auxiliary-brake mechanism and a self-adjusting mechanism, in accordance with this invention.

In FIG. 1, I show, in diagrammatic form, a disk-brake system embodying various principles of the present invention. In this system, the brake housing 100 is formed as a yoke which is shiftable in the direction of arrow A, i.e. parallel to the axis of a disk 101, but is precluded from angular movement by its connection with the axle housing or some other stationary part of the vehicle in a conventional manner. The disk 101 has braking faces 101*a* and 101*b* transverse to the axis of the disk which may be mounted in the usual manner upon the rotating axle or wheel assembly of the automotive vehicle.

It will be understood that the disk 101 can be axially shiftable upon splines or other keying means on the axle when the brake-support yoke 100 is fixed with respect to the chassis and that neither the yoke 100 nor the disk 101 need be axially shiftable when hydraulic devices are mounted on both sides of the disk as illustrated in FIG. 2A–2E, for example. In this brake system, the left-hand lobe 102 of the yoke 100 is provided with a self-adjusting mechanism 110 between the lobe 102 and a brakeshoe 103 while, at the other lobe of the brake, a hydraulic cylinder 104 receives a piston 105 for biasing a brakeshoe 106 against the face 101*b* of the disk 101. A manually operable actuating member is provided at 120 for emergency, locking or parking operation of the brake.

Essentially, the manually operable means 120 is interposed between the piston 105 and the brakeshoe 106 and it will be understood that a duplicate of the mechanically operated means 120 can be substituted for the self-adjusting mechanism 110 or vice versa. The self-adjusting means 110 is here represented as consisting of a pair of wedge-shaped bodies 111 and 112 converging respectively downwardly and upwardly and bearing upon one another along a surface S in the form of an inclined plane including an acute angle to the surface 101*a* of the disk 101. A spring 113 housed in a compartment 111*a*, 112*a* between the confronting faces of the wedge members 111 and 112 which are composed of a synthetic resin of low frictional coefficient, urges the wedge member 111 in the direction of 111*b* and the wedge member 112 in the direction of arrow 112*b*, i.e. in the respective directions of convergence of the surface S and the abutment planes $P_{111}$ and $P_{112}$, respectively. Thus, the wedge member 111 bears against the lobe 102 of the brake support 100 while the wedge member 112 bears against the backing plate 103*a* of the braking shoe 103 and urges the latter in the direction of arrow $B_{103}$ against the disk 101 when the wedges 111 and 112 are shifted relatively in the direction of arrows 111*b* and 112*b*.

The members 111 and 112 are here represented to be integral with one another and are connected by a web 113*a* which may also form the spring tending to draw these wedge members in the respective directions of their convergence. Thus, for operation of the brake, the vehicle operator applies pressure to the pedal 131 which actuates the master cylinder 131*a* to displace hydraulic fluid through the transmission line 131*b* into the cyclinder 104. The piston 105 is pressed to the left and applies its brakeshoe 106 against the face 101*b* of the disk 101 while the reaction force exerted upon the yoke 100 to the right, applies the brakeshoe 103 in the direction of arrow $B_{103}$ to the opposite face 101*a* of the disk. Upon the development of excessive wear of the brake linings 103*b* and 106*b* of the respective brakeshoes 103 or 106, release of the brake pedal 101 permits movement of the yoke 100 to the left (FIG. 1) and develops a slight play between the lobe 102 of the yoke and the brakeshoe 103. Under the action of the spring means 113, 113*a*, the wedge members 111 and 112 are shifted in the direction of the respective arrows 111*b* and 112*b* to take up this play and readjust the position of the brakeshoe 103 automatically. As pointed out earlier, the engagement at the inclined surfaces S of the wedge members 111 and 112, or between the wedge assemblies 111, and 112 and the support member at surface $P_{111}$ or the brakeshoe at surface $P_{112}$ may be self-locking so as to impede reverse relative movement of the wedge members 111 and 112. Alternatively, serrated surfaces with unidirectionally effective teeth may be used. Thus, in this system, wedge members 111 and the lobe 102 are provided at 111*c* with complementarily engaging sawtooth-shaped teeth which permit movement of the wedge member 111 in the direction of arrow 111*b* but prevent reverse movement. At the opposite engagement plane $P_{112}$, a similar sawtooth arrangement 112*c* is provided between the wedge member 112 and a backing plate 103*a* of brakeshoe 103. Thus, after either or both of the wedge members 112 have advanced in the direction of the arrows 111*b* and 112*b*, reverse movement is precluded and the brakeshoe locked in its adjusted position. Alternatively, or in addition, cooperating teeth may be provided at 111*d* and 112*d* of the confronting surfaces of the wedge members along the inclined engaging surface S.

To lock the brake, I provide a handle 132 or some other actuating lever in the region of the driver's compartment of the vehicle which is connected via a Bowden line 132*a* whose sheath 120*a* acts upon the upwardly converging wedge member 121 in the direction of arrow 121*a* while the core wire 120*b* extends through the interior of the wedge assembly and is anchored to the downwardly convergent wedge member 122. A spring 123, housed within the interior of the wedge members in compartments similar to those shown at 111*a* and 112*a*, resists relative movement of the wedge member 121 and 122 in the direction of arrows 121*a* and 122*a*. The surfaces at which the wedge assembly 121 and 122 engages the piston 105 or the backing plate 106*a* of the brakeshoe 106, may be serrated as previously described for self-locking action or serrations may be provided upon the inclined engagement surface S′ between the edge members at 121 and 122. Thus, when the lever 132 is actuated, the wedge members 121, 122 are shifted in the direction of the arrows 121*a* and 122*a* to urge the brakeshoe 106 in the direction of arrow $B_{106}$ and lock this brakeshoe against the face 102*b* of the disk. A reaction force is applied to the yoke 100 which draws the brakeshoe 103 against the opposite face of the disk.

In FIGS. 2A–2E, I show a brake system in which the yoke 200 lies along the periphery of a disk 201 and has a pair of yoke halves 202 and 204, each forming a respective hydraulic cylinder and having a piston 205 displaceable by hydraulic fluid from a master cylinder as previously described. Since both yoke halves and the respective actuating systems are identical, only one has been illustrated and described. Each of the brake cylinders is provided with a respective brakeshoe 206 whose brake lining 206*b* is affixed to a backing plate 206*a* and confronts a respective face 201*b* of the disk 201 between the piston 205. The brake system is mounted by a lug 204*a* upon a nonrotating portion of the wheel suspension or axle housing or upon some other nonrotating part of the vehicle chassis or upon a stand or other support when the disk brake is used for industrial brake purposes. The locking-brake assembly is here designated at 220 and comprises a pair of wedge-shaped bodies 221 and 222 converging, respectively, upwardly and downwardly (FIG. 2A), which are shiftable relatively in the direction of arrows **221*b* and 222*b* in the direction of the respective convergences by a Bowden cable 207. A respective Bowden line is provided for each of the assemblies 220**, only one of which is exposed in FIG. 2A.

Figure 2A:
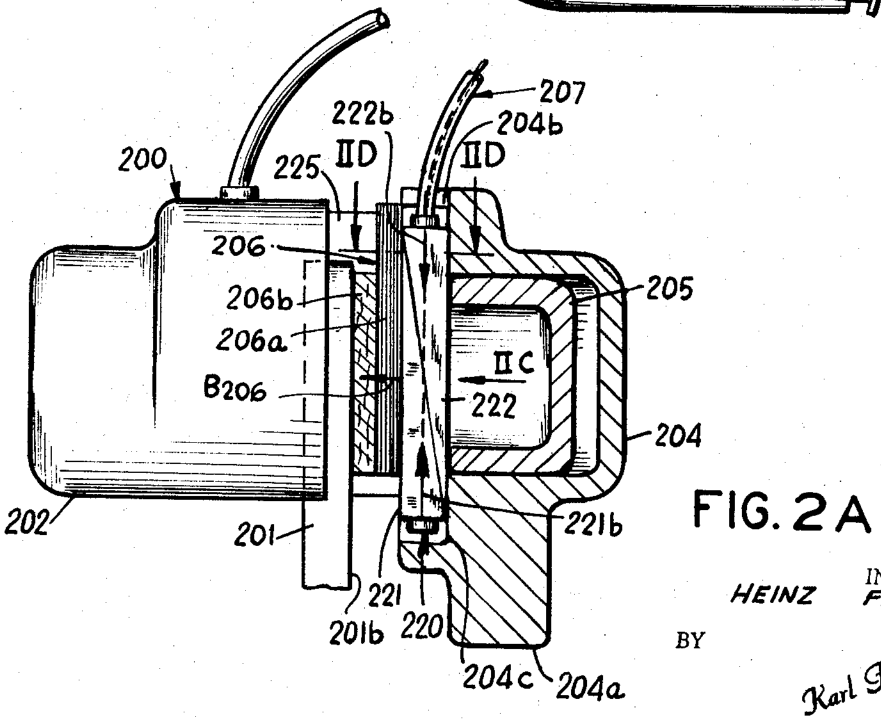
FIG. 2A is an elevational view, partly in axial cross-section, of a hydraulic-disk brake provided with mechanical actuating means for the main brakeshoes, according to one aspect of the invention.
Figures 2B, 2C:
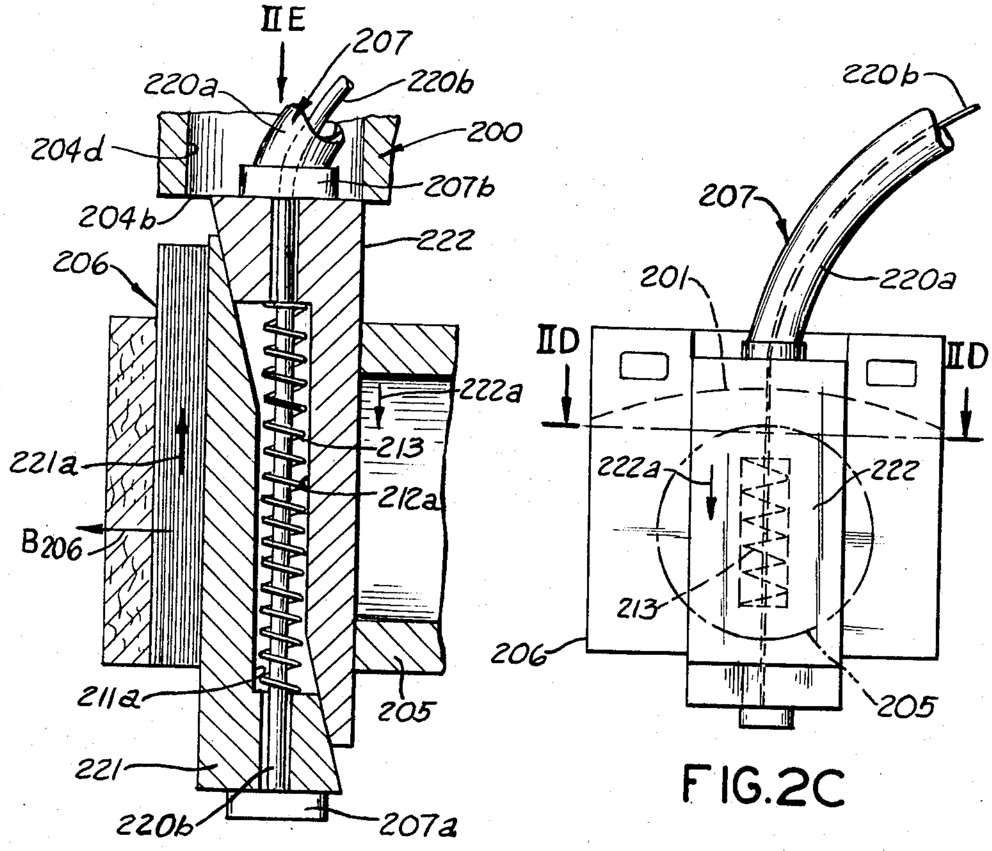
FIG. 2B is a detail view, drawn to an enlarged scale, of the wedge members of the brake of FIG. 2A.
FIG. 2C is a detail view taken in the direction of arrow IIC of FIG. 2A.

As can be seen in FIG. 2B, the Bowden cable 207 comprises a core wire **220*b* which is anchored to the upwardly convergent wedge member 221 by a head 207*a* and passes through both wedge members. The sheath 220*a* of the cable 207 bears at a shoulder 207*b* against the downwardly convergent wedge member 222. The wedge members 221 and 222 are provided with respective confronting recesses 211*a* and 212*a* which form a chamber through which the core wire 220*b* extends and which receives a restoring spring 213. The latter resists movement of the wedge members in the direction of arrows 221*a* and 221*b*. When hydraulic fluid is applied to the cylinder 204 and the oppositely effective cylinders 202 of the yoke 200, the respective pistons 205 etc. shift the brakeshoes 206 etc. against the disk 201. When, however, manual operation of the brake is desired, a lever at the driver's seat of the vehicle or some other remote location is actuated to draw the wire 220*b* through the sheath 220*a* and thereby urge the wedges in opposite directions toward one another. The brakeshoe 206 is thus urged in the direction of arrow $B_{206}$ against the disk 201. Abutments 204*b* and 204*c* are provided for the wedge members 221 and 222 to prevent them from separating when the Bowden line is untensioned. To permit movement of the wedges 221 and 222 with the brakeshoe 206 and the piston 205, the housing 204 is provided with a longitudinally extending slot 204*d* (FIG. 2E) in which the sheath 220*a*** is guided.

Figure 2D:
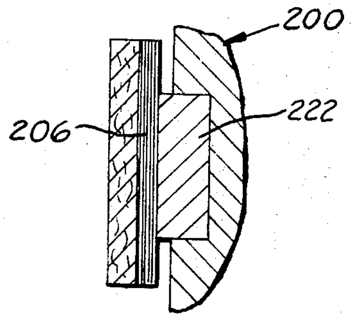
FIG. 2D is a detail cross-sectional view generally along the line IID—IID of FIGS. 2A or 2C.
Figure 2E:
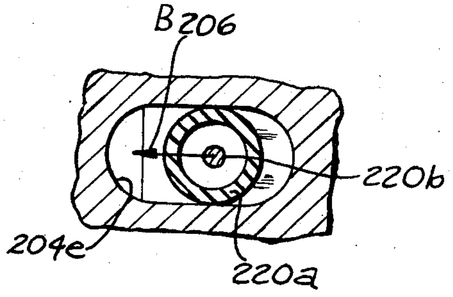
FIG. 2E is a cross-sectional view in the direction of arrow IIE of FIG. 2B.

In FIGS. 2C and 2D, I show an arrangement whereby the wedge member 222 extends over a fraction of the area of the brakeshoe 206 and lies generally in an axial plane of the cylinder 205 perpendicular to the axis of the disk 201 and is in part recessed in the housing 200 which forms a guide for the wedge in its direction of movement (arrow **222*a***).

Figure 3:
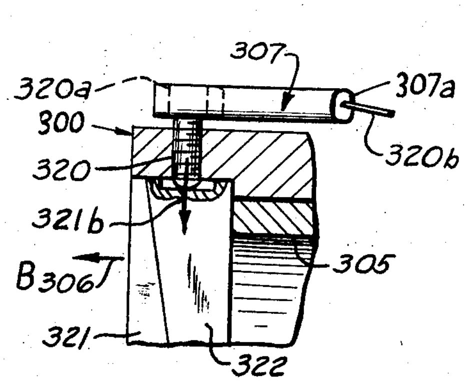
FIG. 3 is a fragmentary view similar to FIG. 2B but illustrating a modification of the actuating system.

In the modification of FIG. 3, the wedge members 321 and 322 are positioned as illustrated in FIGS. 2A–2E between the piston 305 and the disk (not shown) in the brake housing 300. Each of the wedge members 321 and 322 or solely the latter may be shifted relatively in the direction of convergence (arrow **321*b*) by a modified actuating arrangement consisting essentially of a threaded spindle 320 and a lever 307 affixed thereto. To this end, the spindle 320, which is screwed into the housing 300, is provided with a prismatic head 320*a* received in the lever 307 whose other extremity 307*a* may be actuated by a Bowden cable whose core is represented at 320*b*. To permit movement of the wedge assembly and piston 305 in the direction of arrow $B_{306}$ during brake operation, the end of the spindle 320 projects into a slot 304*e* which extends in the direction of this latter arrow. Thus, actuation of the Bowden line 320*b* will swing the lever 307 and turn the spindle 320 to shift the wedge member 322 in the direction of arrow 321*b* and thereby cam the brakeshoe in the direction of arrow $B_{306}$ for locking, emergency-brake or parking brake action. Normal brake actuation is effected by applying hydraulic pressure behind the piston 305**.

Figure 4A:
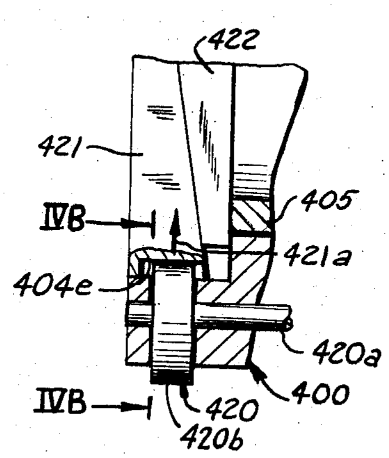
FIG. 4A is another view similar to FIG. 2B wherein the actuating system embodies a crank or eccentric.
Figure 4B:
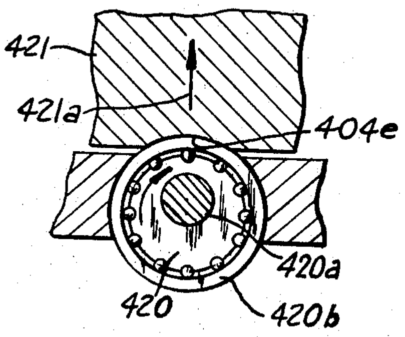
FIG. 4B is a cross-sectional view taken generally along the line IVB—IVB of FIG. 4A.

FIGS. 4A and 4B illustrate another modification of the invention wherein an eccentric disk 420 is mounted in the brake housing 400 and is rotatable about an axis parallel to that of the cylinder 405 by a shaft **420*a*, the latter being actuated by a Bowden line and lever arrangement similar to that described in connection with FIG. 3. Here, the eccentric disk 420 is received in the axially extending slot 404*e* of the wedge member 421 and is adapted to displace the latter (arrow 421*a*) in the direction of its convergence. The co-operating wedge member 422 is interposed between member 421 and the piston 405. In the embodiment of FIGS. 3 and 4A, 4B, a restoring spring may be provided within the interior of the wedge members as illustrated at 213** in FIG. 2*B*. As is apparent from FIG. 4B, the recess **404*e* can have a curvature essentially corresponding to the curvature of the camming disk 420 which is provided peripherally with a roller-bearing race 420*b*** to reduce friction.

The brake housing 500 of the embodiment illustrated in FIG. 5, is provided with a pair of cylinders one of which is shown at 504, each having a respective piston 505 bearing against a wedge assembly 520 whose wedge member 521 and 522, by analogy with the embodiments described previously, are interposed between the piston 505 and a brakeshoe 506 whose brake lining **506*a* is adapted to bear against a disk. The backing plate 506*b* of the brakeshoe is engaged by the wedge member 521. In this embodiment, the disk axis is represented at $D_{501}$ and the wedge member 521 and 522 are shiftable by the Bowden line 507 in the direction of arrows 521*a* and 522*a* parallel to secants of the disk. In this case, the Bowden line 507, whose sheath 520*a* bears upon wedge member 522 and whose core wire 520*b* is anchored to the wedge member 521, is able to be drawn from the housing 500 through a passage 504*b* skew to the axis $D_{501}$ of the disk. This arrangement is especially advantageous when the cable 507 cannot project beyond the outlines of the brake support and facilitates the connection of the Bowden line to the actuating device (132** etc. of FIG. 1).

As illustrated in FIG. 6, the brakeshoe 606 can have its lining **606*a* mounted directly upon one of the wedge members 621 against which the sheath 620*a* of the Bowden line 607 acts, the housing facilitating movement of the brakeshoe 606 both in the direction of convergence (arrow 621*a*) and in the direction of application of the brakeshoe (arrow $B_{606}$). The core wire 620*b* of the Bowden line is anchored to the complementary wedge member 622 which bears against the piston 605 of the hydraulic brake system. When the Bowden line is tensioned, the wedge member 622 is shifted in the direction of the arrow 622*a*. When the system of FIG. 6 is to be used in a parking, emergency or locking-brake, wedge member 622 can bear directly against the brake support so that only upon tensioning of the Bowden line is the auxiliary brakeshoe 606 applied against the disk. Similarly, the unitary arrangement of the wedge member 621 and the brakeshoe 606 can equally be applied to the systems of FIGS. 1, 2A–2E and 3–5 in which case the wedge member 112 will be integral with the brakeshoe 103, the wedge member 121 integral with the brakeshoe 106, member 221 integral with brakeshoe 206 and members 321, 421 and 521** integral with the respective brakeshoes.

In a structural reversal of this arrangement, one of the co-operating wedge surfaces (722) is provided integrally and unitarily upon piston 705 of the disk brake 700 illustrated in FIG. 7 and the movable brakeshoe 721 can be drawn by the core wire **720*b* of the Bowden line 707 in the direction of arrow 721*a*. In this arrangement, the sheath 720*a* of the Bowden line is seated against the piston 705, which is hydraulically displaceable in the cylinder 704 by a brake pedal and master-cylinder arrangement (131, 131*a* in FIG. 1), and is prevented from rotation by a lug 705*a* which is axially guided in a slot 704*c* of the brake housing. The Bowden line 707 is led out of the housing in generally radially inward direction through a passage 704*b* permitting axial movement of the Bowden cable 707 and the piston 705. In normal brake operation the core wire and sheath of the Bowden line 707 move jointly with the assembly 705, 721 under the action of hydraulic fluid to bias the brakeshoe 706** in the direction of the disk (arrow $B_{706}$). For locking, emergency or parking operation, the Bowden line is tensioned to displace the wedge member 721 in the direction of convergence (arrow 721*a*) while the piston 705 is fixed in position, thereby camming the brakeshoe 706 to the left. The Bowden line 707 can then be led along the axle housing of the wheel and permit use if the space below the brake 700 which often is provided with greater clearances below the housing then above it.

It will be understood that various modifications of the systems described earlier should be considered with respect to each of the foregoing embodiments and that compatible modifications described in detail in some cases can be used effectively in others. Thus, instead of guide arrangement illustrated in FIG. 2D to prevent canting of the wedge members, it is possible to provide leaf springs or longitudinally extending spring arrangements within or externally of the wedge assembly to serve as guides. Furthermore, the spindle of FIG. 320 of FIG. 3 or the rod 420*a* of FIGS. 4A and 4B can be actuated by a flexible shaft to shift the wedge members relatively to one another or the spindle or camming disk mounted directly upon one of the wedge members and being engageable with the other for effecting joint movement or relative movement of the wedge members as described in connection with FIG. 1. Furthermore, the wedge members can extend the full width of the brakeshoe, thereby ensuring uniform wear of the latter, while the wedge members may be composed of synthetic resin, preferably of low friction coefficient (e.g. polytetrafluoroethylene) or containing a self-lubricating substance (e.g. molybdenum sulfide). In other possible modifications, the Bowden cable can be replaced by other actuating systems known per se and, to avoid difficulties with the shifting of the cable, the latter can be passed through bent tubes or the like forming guides therefor. The guidance of the flexible cable with respect to the housing is, of course, facilitated by the longitudinal slot previously described or a funnel-shaped passage allowing at least limited mobility for the cable sheath; as illustrated in FIGS. 5–7, the core wire of the Bowden line can be inclined to the plane of the disk and to the inclined wedge plane to facilitate tensioning of the cable and reduce stress in the regions at which the cable emerges from the housing.

Figure 8A:
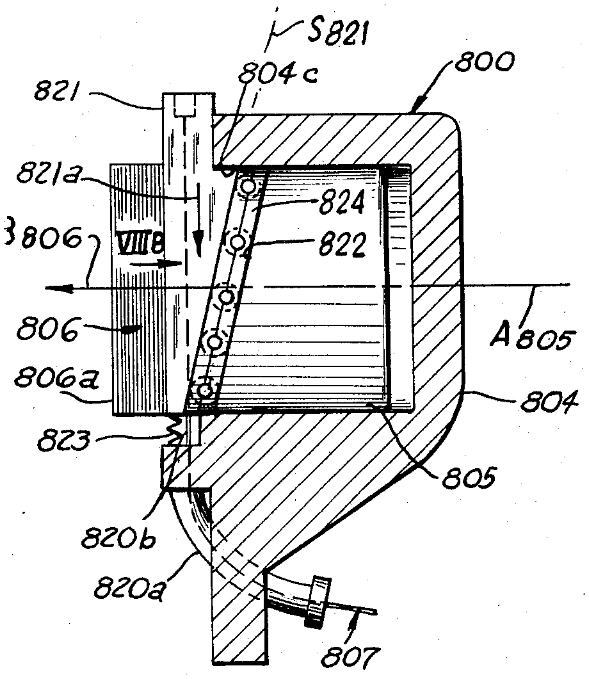
FIG. 8A is an axial cross-sectional view of an arrangement wherein the Bowden cable for shifting the movable wedge member runs radially inwardly, and friction-reducing means is provided between the co-operating surfaces.
Figure 8B:
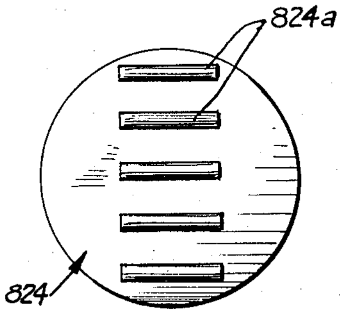
FIG. 8B is a view in the direction of arrow 8B of the antifriction means.

In FIGS. 8A and 8B, I have shown a system in which frictional interengagement between the wedge surfaces can be reduced. In this embodiment, the brake housing 800 has its cylinder 804 provided with a truncated piston 805 whose surface 822 is inclined to the axis $A_{805}$ of the piston and forms one of the co-operating wedge faces. Here, the other wedge member 821, to which the core wire 820*b* of the Bowden line 807 is anchored, is shiftable in the direction of arrow 821*a* and forms the backing plate for the brake line 806*a* of the brakeshoe 806. Between the surface 822 of the piston 805 and the surface $S_{821}$, I provide an antifriction disk 824 provided with bearings (FIG. 8B). Preferably, the bearings are needle bearings 824*a* whose cage is formed by the disk 824 and whose axes of rotation are parallel to one another and to the surface $S_{821}$. A restoring spring 823 resists movement of the wedge member 821 in the direction of 821*a*. When hydraulic fluid is supplied to the cylinder 804, the piston 805 is shifted to the left (arrow $B_{806}$) to urge the brakeshoe 806 against the disk (not shown), the upper end of the wedge member 821 being seated against the abutment surface 804*c*. For emergency-brake purposes, the Bowden line 807 is tensioned to shift the wedge member 821 in the direction of arrow 821*a* with the reduced force afforded by the antifriction disk 824, thereby camming the brake lining 806*a* against the brakeshoe (arrow $B_{806}$). The antifriction disk 824 can, of course, also be provided with ball bearings or roller bearings. The sheath for the core wire 820*b* of the Bowden line 807 is here formed by a rigid guide tube 820*a* fixed in the housing 800. In another modification of this system, the piston 805 is constituted of prismatic or rectangular transverse cross-section to prevent canting within the cylinder 804, the bearing disk 824 having rectangular configuration in this arrangement.

Figure 9:
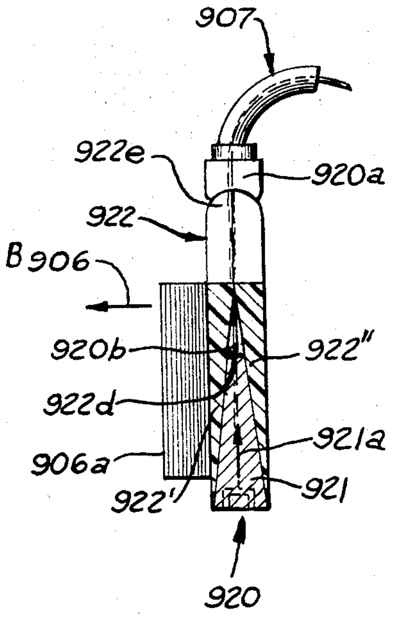
FIGS. 9 and 10 are cross-sectional views in respective vertical planes partially diagrammatically illustrating respective modifications of wedging systems in accordance with the principles of my present invention.
Figure 10:
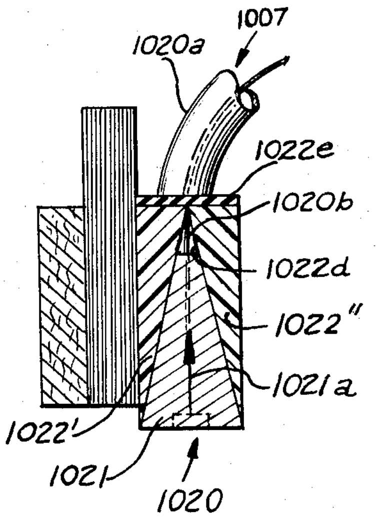

FIGS. 9 and 10 show further modifications of the wedge assembly 920 and 1020 of the present invention, it being understood that such assemblies can be disposed between the brakeshoes and the housings or pistons of any of the systems previously described. In this case, the wedge member 922 (FIG. 9) is bifurcated or of U-shaped section so as to have downwardly convergent legs 922′ and 922″ forming a V-shaped recess 922*d*. The bight portion 922*e* integrally connects the legs 922′ and 922″ and resiliently permits the spreading of these legs. An upwardly convergent wedge member 921 is received between the legs 922′, 922″ and is drawn upwardly upon tensioning of the Bowden line 907 whose core wire 920*b* in anchored to the wedge 921 while the sheath 920*a* bears against member 922. The brake lining 906*a* is here mounted directly upon the leg 922′ while the other leg can bear against the housing of the brake or the piston. When the wedge member 921 is drawn upwardly (arrow 921*a*) by the Bowden line, the leg 922′, 922″ are spread apart and the brake linings 906*a* urged in the direction of arrow $B_{906}$ to engage the disk. It has been found that this arrangement provides an unsymmetrical pressure of the brake lining 906*a* against the disk with greater force from below. Since disk brakes are characterized by uneven wear because of increasing peripheral speed with radial spacing from the center of rotation of the disk, compensation of the unevenness may be provided in this manner. In the modification of FIG. 10, the two legs 1022′ and 1022″ of the assembly 1020 are connected with a web 1022*e* of elastically yieldable material. Again, the wedge member 1021 can be drawn upwardly in the dicetion of arrow 1021*a* by the core wire 1020*b* of the Bowden line 1007 whose sheath 1020*a* bears against the web 1022*e*. Either the outer flanks of the wedges 921 and 1021 can be provided with needle bearings or other antifriction means as illustrated in FIG. 8B or such antifriction devices can be provided at the inner flanks of the V-shaped recesses 922*d* and 1022*d*. When the needle bearings are built into these surfaces, it is preferred that the bearings upon juxtaposition surfaces be offset from one another to facilitate movement and be recessed to save space. The assembly should be provided with an opening (e.g. as represented at 225 in FIG. 2A) enabling both the brakeshoe 206 and the respective wedge assembly 220 to be withdrawn generally radially from the housing for inspection and repair. This arrangement should also be provided in the other embodiments described heretofore.

Figure 11A:
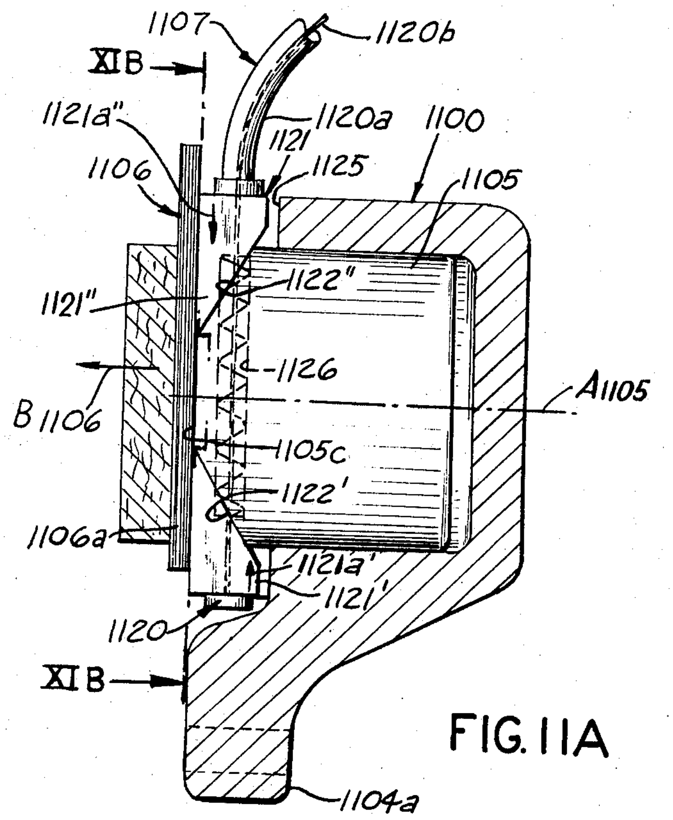
FIG. 11A is an axial cross-sectional view through a brake cylinder in which a pair of oppositely effective wedge members co-operate with the piston.
Figure 11B:
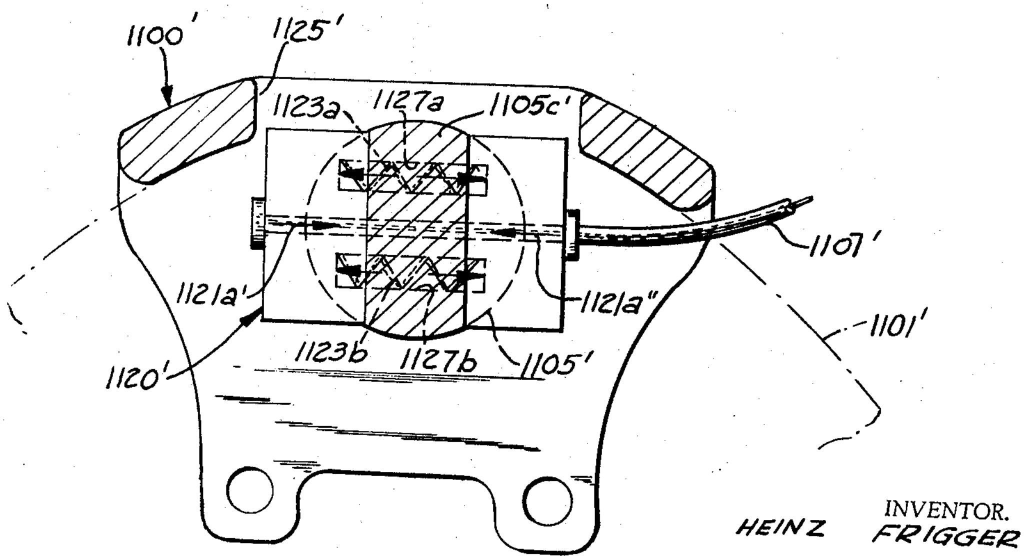
FIG. 11B is a cross-sectional view taken generally along the line XIB—XIB of FIG. 11A, showing a similar but slightly modified brake.

In FIGS. 11A and 11B, I show the right-hand half of a disk brake 1100 whose cylinder 1104 receives the piston 1105 which acts upon the brakeshoe 1106 under hydraulic pressure in the usual manner. A lug 1104*a* permits the housing to be affixed to a stationary vehicle portion while the disk (not shown) rotates past this housing. The face 1105*c* of piston 1105, which is directly engageable with the backing plate 1106*a* of the brakeshoe 1106, extends perpendicularly to the axis $A_{1105}$ and parallel to the brakeshoe 1106 and to the braking face of the disk. One of the wedge members is hereformed by the piston 1105 which is provided with inclined faces 1122′ and 1122″, imparting a generally trapezoidal configuration to the piston 1105. The co-operating wedge member 1121 is of bipartite configuration and has a pair of upwardly and downwardly converging portions 1121′ and 1121″ respectively engaging the surfaces 1122′ and 1122″ and adapted to bear against the backing plate 1106. A Bowden line 1107 has its sheath 1120*a* bearing against the wedge portion 1121″ and a core wire 1120*b* extending through the wedge member and a suitable slot 1126 in the piston 1105 to its anchorage at the other wedge portion 1121′. Upon tensioning of the Bowden line, therefore, the wedge portions 1121′ and 1121″ are shifted relatively in the direction of arrows 121*a*′ and 1121*a*″ to cam the brakeshoe 106 in its brake-locking direction (arrow $B_{1106}$). In the beveled portion of the piston 1105 and preferably in suitable recesses 1127*a* and 1127*b* thereof, I provide restoring springs 1123*a* and 1123*b* which urge the wedge portions 1121' and 1121'' apart, counter to the action of the Bowden line 107. While the system of FIG. 11A represents a movement of the wedge members in a direction parallel to a radius of the disk, the assembly of FIG. 11B has a modified housing 1100' which permits movement of the wedge members parallel to a secant of the disk 1101'. Otherwise, the systems of FIGS. 11A and 11B are similar. In the arrangement of FIG. 11B, moreover, the Bowden line 1107' can be led from the housing of the brake in the narrow gap between the dished portion of the wheel disk and its rim. In the embodiments of FIGS. 11A and 11*B*, the surface **1105*c* or 1105*c*' bears directly against the backing plate 1106*a* of the brakeshoe 1106 without intervention of the wedge assembly 1120 or 1120' and this wedge assembly is thus not subjected to elevated hydraulic pressures. The periphery of the piston is represented in FIG. 11B at 1105'**.

Figures 12, 13, 13A, 13B:
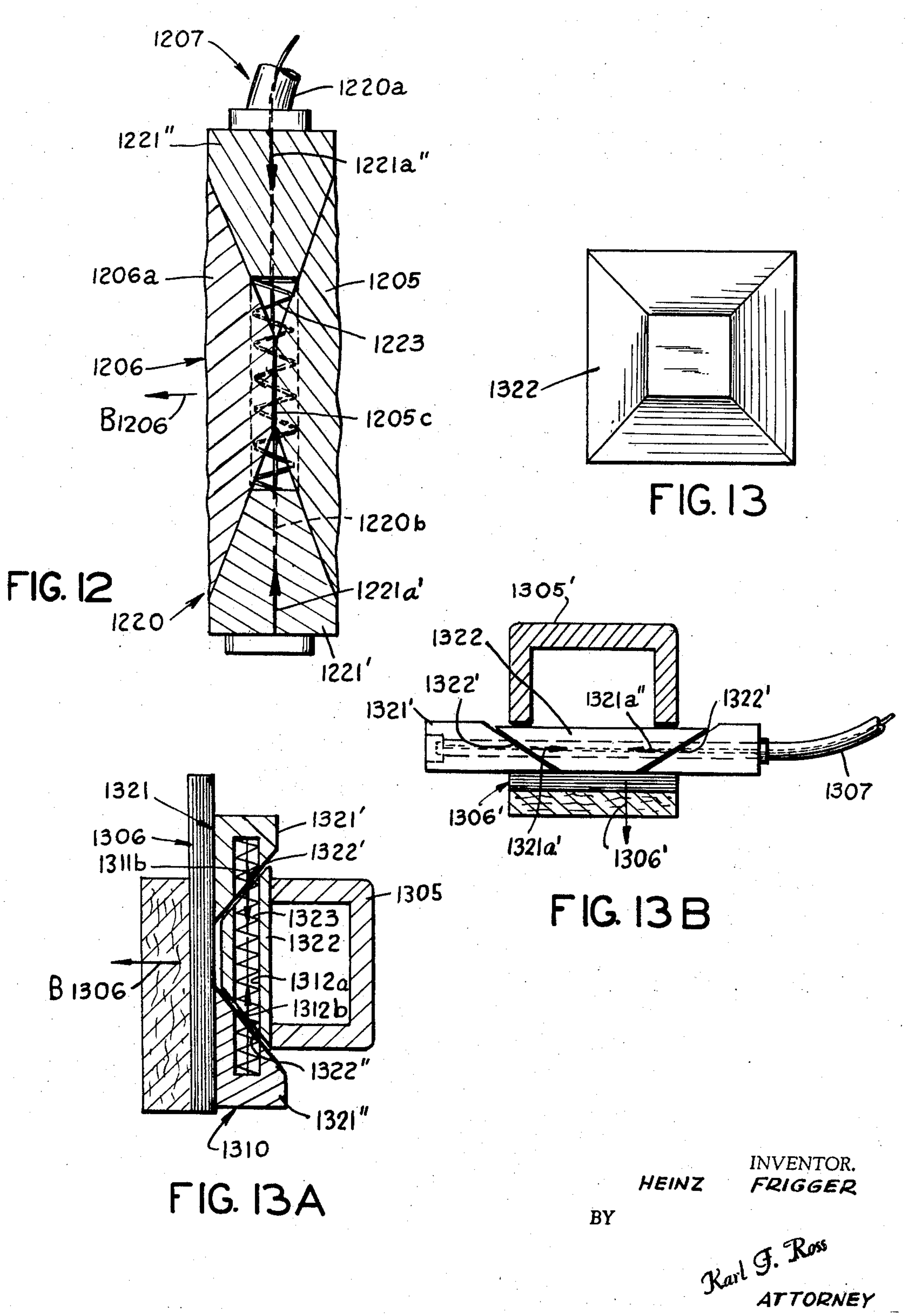
FIG. 12 is a cross-sectional view drawn in enlarged scale of a modified wedging system employing principles developed in connection with FIGS. 11A and 11B.
FIG. 13 is an end view of a frustopyramidal body used as a wedging member in a brake-actuating system in accordance with this invention.
FIG. 13A is an axial cross-sectional view, at least partly diagrammatic, showing the use of the body of FIG. 13 in a self-adjusting device for a disk brake.
FIG. 13B is a view similar to FIG. 13A illustrating the use of the body of FIG. 13 in a manually operable locking or emergency-brake system.

The wedge assembly 1220 of FIG. 12 differs from that of FIGS. 11A and 11B in that the generally trapezoidal portions represented at **1206*a* and 1205, respectively, are formed as part of the backing plate of the brakeshoe and of the piston respectively, the wedge portions 1221' and 1221'' being forced between the backing plate and the piston. Direct engagement between the piston and the backing plate is effected at the surface 1205*c* while a Bowden line 1207 has its sheath 1220*a* in engagement with the wedge portion 1221'' and its core wire 1220*b* anchored to the wedge portion 1221'. Under normal brake conditions, the restoring spring 1223 between the wedge portions 1221' and 1221'' urges them apart and hydraulic pressure applied to the piston 1205 brings the surface 1205*c* of the latter into direct engagement with the brakeshoe 1206 at its backing plate 1206*a* and thereby shifts the latter in the direction of arrow $B_{1206}$ against the disk. When emergency-brake action is required, the Bowden line 1207 is tensioned and the wedge portion 1221', 1221'' displaced in the direction of arrows 1221*a*' and 1221*a*'' to cam the members 1205 and 1206*a* apart, thereby applying the brake. Each of the wedge members 1121', 1121'' and 1221', 1221'' is, of course, generally trapezoidal. A passage is provided at 1125 and 1125' in the housing 1100 and 1100'** to enable the wedge assemblies and brakeshoes to be removed radially from the housing.

In FIGS. 12, 13A and 13B, I show embodiments of my present invention wherein at least one of the wedge members is of generally pyramidal configuration, it being understood that the pyramidal portion can be formed by the piston member or the brakeshoe member as has been described in connection with FIGS. 11A, 11B and 12. Thus, according to this aspect of the invention the piston or brakeshoe members can be of polygonal cross-section, rather than the round cross-section of FIGS. 11A, 11B and 12, and may have flanks corresponding to the flanks 1122' and 1122'', corresponding to the surfaces of a pyramid. In a modification of this system, a pyramidal body 1322 forms the co-operating wedge member and can bear either against the brakeshoe or the piston. In FIG. 13A, I show an arrangement of this type in which the wedge assembly 1310 forms a self-adjusting means for the brake. In this arrangement, the pyramidal member 1322 is formed with a throughgoing passage **1312*a* through which one or more springs 1323 extend to draw the wedge portions 1321' and 1321'' of the other wedge member 1321 toward one another as represented by the arrows 1311*b* and 1312*b*. The inclined surfaces of the wedge portions 1321' and 1321'' engage the flanks 1322' and 1322'' of the pyramidal member 1322 and cam the brakeshoe 1306 toward the disk (arrow $B_{1306}$) to maintain only a limited play of this brakeshoe when the piston 1305 is hydraulically withdrawn. To prevent slippage, the co-operating surfaces of the wedge members 1321 and 1322 may be toothed as described in connection with FIG. 1. The piston 1305 bears against the flat face of the frustopyramidal member 1322 and may be either of prismatic or round cross-section. The operation of this self-adjusting mechanism is of course similar to those of the mechanism 110** of FIG. 1.

In the modification of FIG. 13B, a similar arrangement is employed for a remote-operation locking brake or the like. In this embodiment, the frustopyramidal member 1322' is disposed between the piston 1305' and the brakeshoe 1306' while the wedge assembly comprises a wedge member 1321', 1321'' of the type described in connection with FIGS. 11A and 11B. The Bowden cable 1307 has its core wire anchored to member 1321' while its sheath engages the portion 1321'' so that, upon tensioning of the Bowden line, the wedge portions 1321' and 1321'' are drawn together (arrows **1321*a*' and 1321*a*'') and the brakeshoe 1306' cammed in the direction of arrow $B_{1306'}$. In this embodiment, friction linings are provided on the faces 1322' of the pyramidal body 1322 or the complementary inclined faces of members 1321' and 1321''** whereby the device is made self-locking.

Figures 14A, 14B:
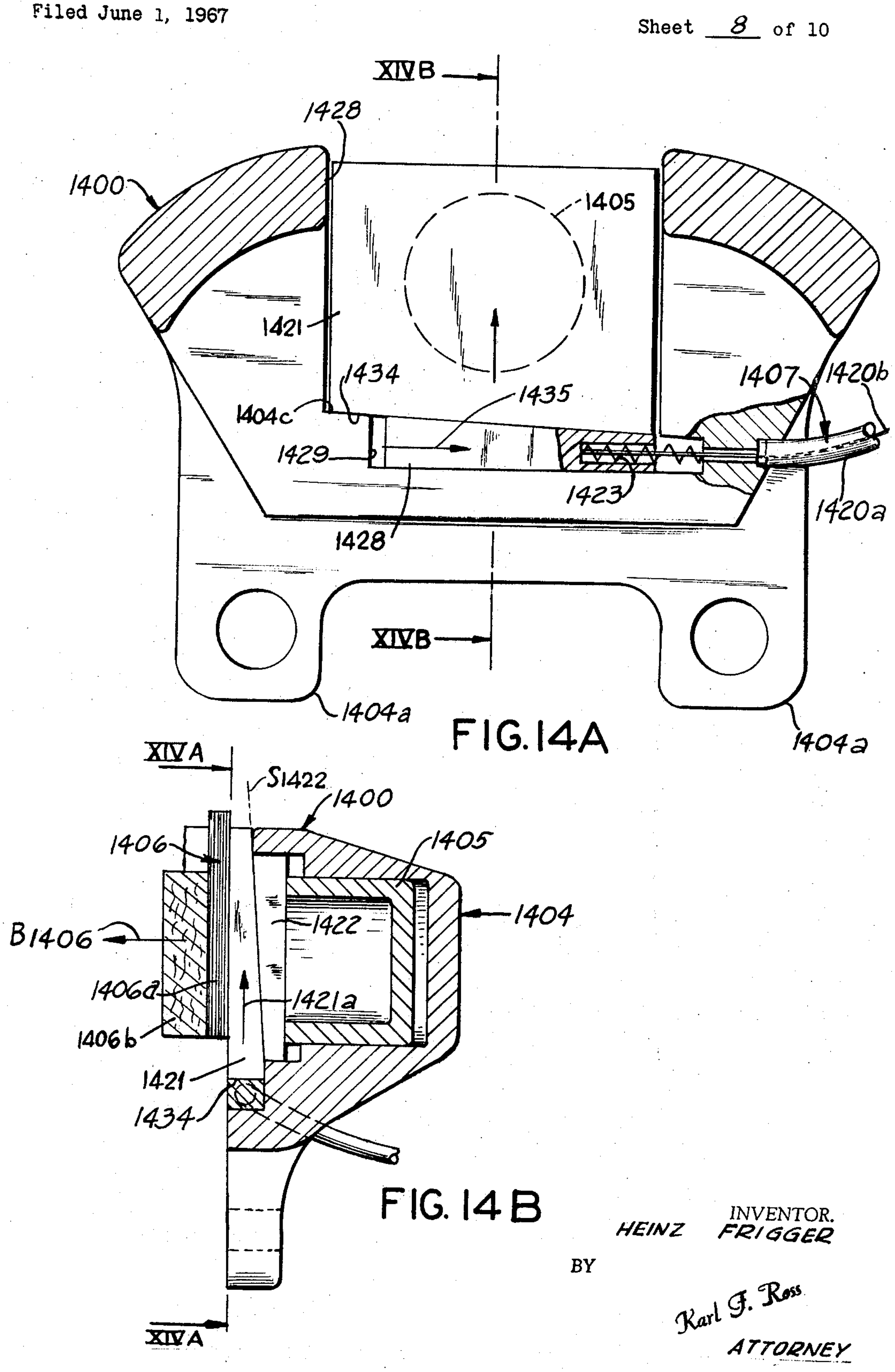
FIG. 14A is a partial cross-section along the line XIVA—XIVA of FIG. 14B and representing an end view of part of a brake yoke from the side of the disk in a disk brake provided with a wedging member in accordance with a modification of this invention.
FIG. 14B is a cross-sectional view taken along the line XIVB—XIVB, of FIG. 14A.

FIGS. 14A and 14B represent another embodiment of this invention in which the brake housing is represented at 1400 and can be mounted via lugs **1404*a* to the axle housing of the vehicle wheel at the cylinder 1404 of the device. The piston 1405 of this arrangement is axially shiftable in its cylinder 1404 and is provided at its left-hand end with a wedge body 1422 integrally formed as part of the piston 1405 or mounted thereon. The movable wedge member 1421 here has an inclined-plane surface $S_{1422}$ inclined upwardly toward the disk (not shown) and adapted to urge the brakeshoe 1406 in the direction of the arrow $B_{1406}$ for aplication of the brake. The brakeshoe 1406 has a friction lining 1406*b* engageable with the disk and a backing plate 1406*a* abutting against a face of wedge member 1421. A further wedge arrangement is provided in the housing 1400 to shift the auxiliary-brake wedge 1421 in the direction of arrow 1421*a***, this mechanism being best seen in FIG. 14A.

The actuating mechanism here includes a Bowden line 1407 whose sheath **1420*a* is anchored to the yoke 1400 and whose core wire 1420*b* engages an actuating wedge 1428 to displace the latter against the force of a restoring spring 1423 within a compartment 1429 of the housing 1400 beneath member 1421. The bottom surface 1434 of the wedge member 1421 slidably engages wedge 1428 so that axial movement of the assembly 1421, 1422 and 1406 (arrow $B_{1406}$) by the piston 1405 is not impeded. The surface 1434 of the member 1421 is inclined complementary to the configuration of the actuating wedge 1428 so that, when the Bowden cable 1407 is tensioned, the wedge 1428 is displaced in the direction of arrow 1435 (FIG. 14A) against the restoring force of spring 1423, and the auxiliary-brake member 1421 is consequently shifted in the direction of arrow 1421*a*. This upward movement of member 1421 urges the brakeshoe 1406 into engagement with the brakeshoe. When the Bowden cable tension is released, the compression spring 1423 shifts the actuating wedge 1428 to the line (FIG. 14A) and permits member 1421 to descend. An opening is provided at 1425 to permit concurrent radial withdrawal of the brakeshoe 1406 and the wedge member 1421. Bowden line 1407 may be, of course, actuated by any convenient mechanism at the driver's post of the vehicle, e.g. the lever arrangement 132, 132*a* described in connection with FIG. 1. This device can be modified simply to render it suitable for use as a self-adjusting mechanism merely by omitting the Bowden cable 1407 and using a tension spring at 1423. In this case, the wedge 1428 is advanced in the direction of arrow 1435 when excessive play develops between the brakeshoe 1406 and the piston 1405, driver's movement of the actuating wedge 1428 being received by the self-locking action of the ramp of this wedge. When the self-locking angle is selected and the Bowden line used in the assembly of FIG. 14A, the device acts simultaneously as a manually operable locking brake and a self-adjusting means. A seat is provided in the housing at 1404*c*** for the wedge member 1421 to maintain the lever in position for actuation.

Figures 15, 16A, 16B, 17:
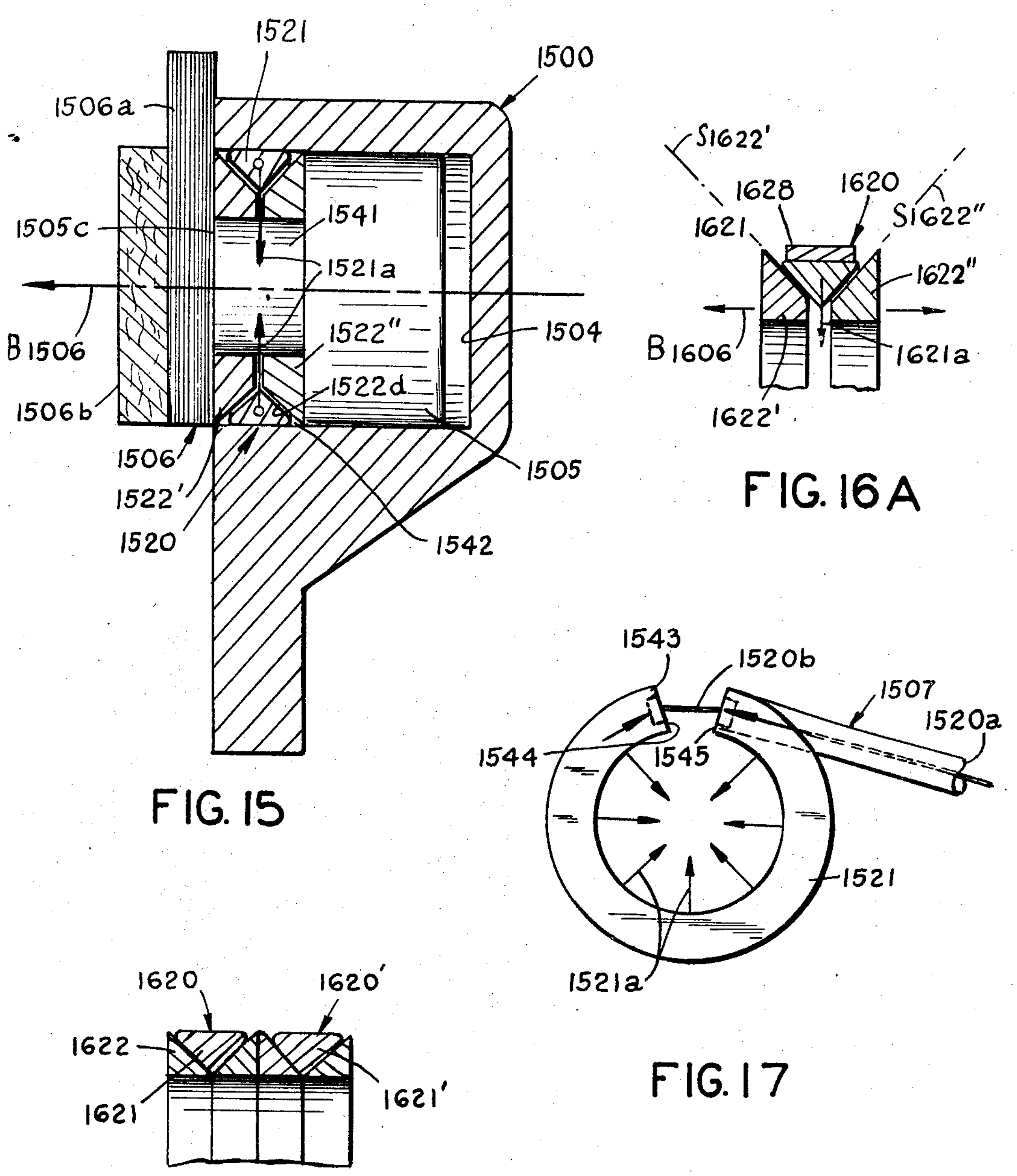
FIG. 15 is an axial cross-sectional view of a wedge arrangement in accordance with another aspect of my invention, the wedge member forming at least part of a ring.
FIG. 16A is an axial cross-sectional view of a wedging-ring arrangement in accordance with this aspect of the invention.
FIG. 16B is a view similar to FIG. 16A of a dual actuating arrangement.
FIG. 17 is a plan view of the actuating ring of FIG. 15 and its Bowden line, partly in diagrammatic form, illustrating the force components when the movement of the actuating member is radially inwardly.

In FIG. 15, I show the right-hand portion of a brake housing 1500 whose cylinder 1504 receives a piston 1505 of round cross-section and bears via an axial abutment boss 1541 with a surface 1505c against the backing plate 1506a of a brakeshoe 1506 whose lining 1506b is engageable with the disk. Thus, when hydraulic fluid is supplied to the cylinder 1504, the piston 1505 directly urges the brakeshoe 1506 against the disk in the direction of arrow $B_{1506}$. In the annular gap 1542 within the cylinder 1504 surrounding the boss 1541, I provide a self-adjusting or remotely controlled auxiliary brake arrangement having wedge members and indicated generally at 1520. This mechanism comprises an elastically deformable wedging ring 1521 of triangular cross-section whose vertex is received in a V-section peripheral gap 1522d between a pair of frustoconical rings 1522′ and 1522″ which are cammed axially outwardly when a radial inward compression is applied thereto in the direction of arrows 1521a, as described in greater detail in connection with FIGS. 16A and 16B, FIG. 17, etc. Upon radial inward movement of the ring 1521, the beveled ring 1522″ is seated against the piston 1505 while the other beveled ring 1522′ is cammed axially outwardly (arrow $B_{1506}$) to urge the brakeshoe 1506 against the disk. As shown in FIG. 17, the ring 1521 is split at 1543 and has an end 1544 to which the core wire 1520b of a Bowden 1507 is anchored. The sheath 1520 of this cable is seated in the other extremity 1545 of the split ring 1521 which, upon tensioning of the Bowden line, has its ends drawn together to apply radially inward compressive forces (arrow 1521a) to the beveled faces of the rings 1522′ and 1522″. The Bowden cable here runs generally tangentially to the ring 1521.

In FIG. 16A, I show a modification of the assembly described in connection with FIGS. 15 and 17 wherein the rings 1622′ and 1622″ flanking the ring-shaped wedge member 1621 is urged radially inwardly (arrow 1621a) by a band 1628 which may be tensioned by a Bowden line as shown at 1507 in FIG. 17; the beveled ring 1622″ is seated against the piston or the housing while ring 1622′ is urged in the direction of arrow $B_{1606}$ to shift the brakeshoe against the disk. When the device is used as a self-adjusting means, the engagement surfaces $S_{1622'}$ and $S_{1622''}$ are of self-locking frictional coefficient and the ring 1628 is resilient to urge the wedge member 1621 radially inwardly and perform the function of the spring 113 of FIG. 1. The entire assembly 1620 is displaced when the piston directly engages the brakeshoe or can be interposed between the piston and the brakeshoe.

In the system of FIG. 16B, a pair of wedge assemblies 1620 and 1620′ are axially stacked and have respective elastically deformable split-ring wedges 1621 and 1621′ which engage the beveled rings 1622 as previously described. One of these wedges 1621 or 1621′ may be effective as a self-adjusting means in the manner previously described while the other is operated by a Bowden line 1807 (see FIG. 17).

Figure 18A:
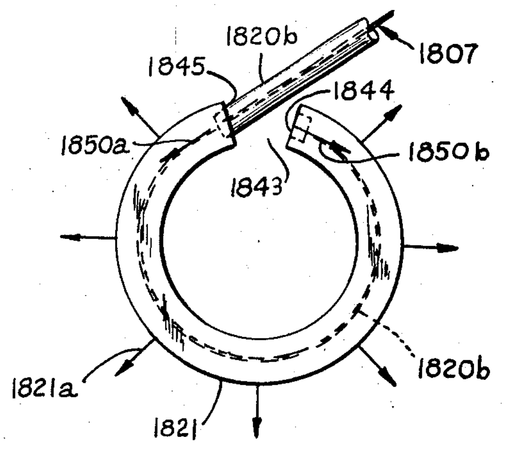
FIG. 18A is a view similar ot FIG. 17 illustrating radial outward movement of the wedging member.
Figure 18B:
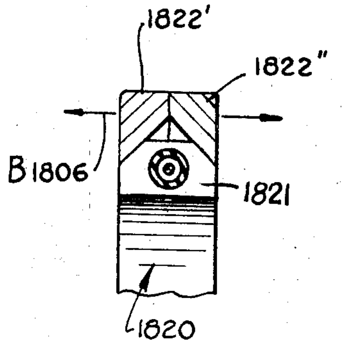
FIG. 18B is a cross-sectional view through the ring and wedge assembly of the device, using the actuating means of FIG. 18A.

An alternative arrangement is represented in FIG. 18B wherein the elastically deformable ring 1821 has one end 1844 of its split 1843 anchored to the core element 1820b of a Bowden cable 1807 whose sheath 1820b bears against the other end 1945 of this ring. While the Bowden cable of the embodiment of FIG. 17 spanned the gap 1543 between the ends 1544 and 1545 of the split ring, the core element of the embodiment of FIGS. 18A and 18B extends through the ring 1821. Thus, when the Bowden line is tensioned, the ends 1544 and 1545 are spread apart at the gap 1843 as represented by arrows 1850a and 1850b to apply radial outward force in the direction of arrow 1821a. A pair of inwardly beveled rings 1822′ and 1822″ flank the outwardly converging wedge member 1821 and are biased axially outwardly (arrow $B_{1806}$) to urge the brakeshoe against the disk. The rings 1821, 1822′, 1822″, etc. may form wedge assemblies 1820 which can be stacked as illustrated within assemblies 1620 and 1620′ in FIG. 16B.

Figure 19:
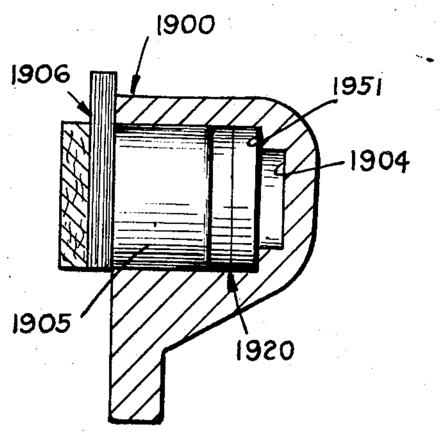
FIG. 19 is an axial cross-sectional view in which the wedging arrangement is shown to be positioned between the brake-support member and the piston member, by contrast with earlier-described systems in which the wedging means is provided between the brakeshoe and the hydraulic piston.

Whereas the wedge assemblies 1520, 1620, 1820 are provided between the piston and the brakeshoe (cf. FIG. 5), it will be understood that other arrangements of the piston brakeshoe and wedge assembly are also possible. Thus, in the system of FIG. 19, the brake housing 1900 has a cylinder 1904 whose piston 1905 bears directly on the brakeshoe 1906 while the annular self-adjusting or Bowden-actuated annular wedge assembly 1920 is disposed between a seat 1951 in the cylinders 1904 and the rear end of the piston 1905.

Figure 20:
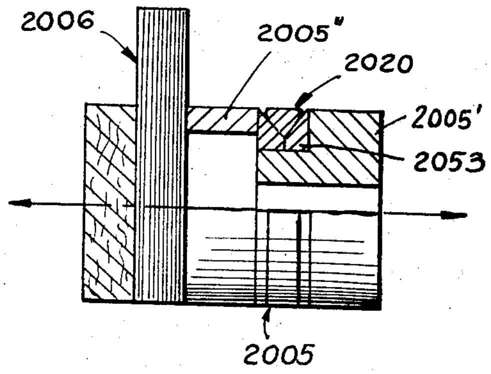
FIG. 20 is a fragmentary axial cross-sectional view of a system in which the wedging device is provided within the actuating means.

In the modification of FIG. 20, the piston 2005, which is hydraulically shiftable in the cylinder in the usual manner, is subdivided axially into an annular right-hand portion 2005′ and a left-hand portion 2005″ which bears upon the brakeshoe 2006. In an annular clearance 2053 between the portions of the piston 2005′ and 2005″, I provide the self-adjusting or Bowden-operated wedge system 2020 which, in this embodiment, can be identical to the assembly illustrated in FIG. 15 at 1520. The assembly 1920 can likewise be constituted either as the wedge assembly 1520 or assemblies 1620 or 1820. When either arrangement is used in a self-adjusting system, the wedging faces of the rings are toothed (FIG. 1) or provided with layers of high frictional resistance (FIG. 13B) in the manner previously described. The Bowden lines of FIGS. 17, 18A or the other annular wedge assemblies can, of course, be replaced by a threaded spindle adapted to draw the ends of the wedging ring together (FIG. 17) or spread them apart (FIG. 18A).

Figure 21:
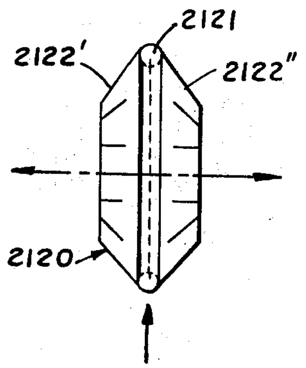
FIG. 21 is an elevational view of a system in which the stressing member of a locking brake in accordance with this invention is comprised of a pair of dished springs.

FIG. 21 shows a wedge assembly in which the rings 2122′ and 2122″ are spread axially by a compression ring 2121 which may be drawn radially inwardly as illustrated and described in connection with FIG. 17. This assembly, too, is represented at 2120 and may be disposed in any of the arrangements illustrated and described with respect to the assemblies 1520, 1620 and 1820.

The invention described and illustrated is believed to admit of many modifications within the ability of persons skilled in the art.

I claim:

1. In a disk-brake system having a brake disk, a brake-support member disposed along the periphery of the disk, a brakeshoe member flanking a braking face of said disk, and an actuating member on said support member for shifting said brakeshoe member into engagement with said disk to brake relative rotation of said support member and said disk, the improvement which comprises auxiliary means on said support member for shifting said brakeshoe member, including a pair of wedging plates having complementarily inclined wedging surfaces slidably engaging one another and disposed between two of said members, said plates each being displaceable in the direction of convergence of the respective wedging surface and oppositely to the direction of displacement of the other plate, said wedging plates having mutually parallel faces bearing upon said two members, and means for applying force to said wedging plates in said directions, and perpendicular to the direction of the movement of said brakeshoe member.

2. The improvement defined in claim 1 wherein said wedging plates are disposed between said actuating member and said brakeshoe member, said actuating member constituting a piston of a hydraulic brake-actuating cylinder.

3. The improvement defined in claim 2 wherein said wedge plates are mounted in said support member for movement generally along said braking face parallel to a radius of said disk.

4. The improvement defined in claim 2 wherein said means for applying said force to said wedging plates in said direction is a spring bearing upon said wedge body, said spring being effective upon the development of sufficient play between said brakeshoe member and said piston to admit the movement of said wedging plates by said spring, said wedging plates being self-locking upon advance by said spring in said direction.

5. The improvement defined in claim 2 wherein said means for applying said force to said wedging plates includes a cam rotatably mounted in said support member.

6. The improvement defined in claim 2, further comprising restoring-spring means at least partly received in said wedging plates and resisting displacement thereof by said force.

7. The improvement defined in claim 2 wherein said wedging plates are mounted in said support member for movement in said direction parallel to a secant of said disk.

8. The improvement defined in claim 2 wherein one of said wedging plates is split and formed with a V-shaped notch, the other of said wedging plates having a configuration complementary to that of said notch, said means for applying said force in said direction including mechanism for shifting said other wedge body into said notch.

9. The improvement defined in claim 2 wherein said support member is provided with guide means engaging said plates and constraining same to movement in said directions.

10. The improvement defined in claim 2 wherein said support member is provided with means enabling joint removal of said brakeshoe member and said wedging plates therefrom.

11. The improvement defined in claim 2 wherein said means for applying said force to said wedging plates is a Bowden line having a core wire and sheath respectively anchored to said plates.

12. The improvement defined in claim 11 wherein said Bowden line is anchored to one of said wedging plates and is connected thereto skew to the axis of said disk.

13. The improvement defined in claim 11 wherein said Bowden line emerges from said support member and extends at least partly parallel to the axis of said disk.

14. The improvement defined in claim 11 wherein said wedging plates are jointly shiftable by said piston in said support member perpendicularly to said braking face and said Bowden line extends through said support member, said support member being formed with a clearance receiving said Bowden line and enabling movement thereof with said wedging plates perpendicular to said face of said disk.

References Cited

UNITED STATES PATENTS

| | | | |
|---|---|---|---|
| 1,863,825 | 6/1932 | Blackmore. | |
| 2,983,338 | 5/1961 | Vansteenkiste | 188—73 |
| 3,269,491 | 8/1966 | Betart et al. | 188—73 |
| 3,298,469 | 1/1967 | Robinette | 188—73 |

FOREIGN PATENTS

| | | |
|---|---|---|
| 1,345,576 | 11/1963 | France. |
| 772,070 | 4/1957 | Great Britain. |

GEORGE E. A. HALVOSA, *Primary Examiner.*

U.S. Cl. X.R.

192—93; 188—106; 74—110; 188—196